(12) United States Patent
Deetz et al.

(10) Patent No.: US 11,235,533 B2
(45) Date of Patent: Feb. 1, 2022

(54) RESIN VISCOSITY DETECTION IN ADDITIVE MANUFACTURING

(71) Applicant: Carbon, Inc., Redwood City, CA (US)

(72) Inventors: Joshua D. Deetz, Gilroy, CA (US); Catherine E. Wood, Redwood City, CA (US); Ronald A. Truong, San Mateo, CA (US)

(73) Assignee: Carbon, Inc., Redwood City, CA (US)

( * ) Notice: Subject to any disclaimer, the term of this patent is extended or adjusted under 35 U.S.C. 154(b) by 91 days.

(21) Appl. No.: 16/845,416

(22) Filed: Apr. 10, 2020

(65) Prior Publication Data

US 2020/0338830 A1 Oct. 29, 2020

Related U.S. Application Data

(60) Provisional application No. 62/839,187, filed on Apr. 26, 2019.

(51) Int. Cl.
*B29C 64/124* (2017.01)
*G01N 11/10* (2006.01)
*G01L 5/00* (2006.01)
*B29C 64/393* (2017.01)
*B29C 64/245* (2017.01)
*B29C 64/232* (2017.01)
*B29C 64/264* (2017.01)
*B29C 64/129* (2017.01)
(Continued)

(52) U.S. Cl.
CPC .......... *B29C 64/393* (2017.08); *B29C 64/124* (2017.08); *B29C 64/129* (2017.08); *B29C 64/232* (2017.08); *B29C 64/245* (2017.08); *B29C 64/264* (2017.08); *G01L 5/0076* (2013.01); *G01N 11/10* (2013.01); *B33Y 10/00* (2014.12); *B33Y 30/00* (2014.12); *B33Y 50/02* (2014.12); *G01N 2011/006* (2013.01)

(58) Field of Classification Search
CPC ... B29C 64/124; B29C 64/129; B29C 64/135; G01N 2011/006; G01N 11/10
See application file for complete search history.

(56) References Cited

U.S. PATENT DOCUMENTS 9,205,601 B2  12/2015  Desimone et al.
9,211,678 B2  12/2015  Desimone et al.
(Continued)

FOREIGN PATENT DOCUMENTS

WO  2018111533 A1  6/2018

OTHER PUBLICATIONS

Tumbleston, John R., et al., "Continuous liquid interface production of 3D Objects", Science, 347(6228), 2015, 1349-1352.

*Primary Examiner* — Atul P. Khare
(74) *Attorney, Agent, or Firm* — Myers Bigel, P.A.

(57) ABSTRACT

A method of measuring the viscosity of a resin in a bottom-up additive manufacturing apparatus, includes the steps of: (a) providing an additive manufacturing apparatus including a build platform and a light transmissive window, said build platform and said window defining a build region there between, with said window carrying a resin; (b) advancing said build platform and said window towards one another until said build platform contacts said resin; (c) detecting the force exerted on said build platform by said resin; and (d) generating in a processor a viscosity measure of said resin from said detected force.

9 Claims, 3 Drawing Sheets

(51) Int. Cl.
    *B33Y 50/02*     (2015.01)
    *B33Y 10/00*     (2015.01)
    *B33Y 30/00*     (2015.01)
    *G01N 11/00*     (2006.01)

(56) References Cited

U.S. PATENT DOCUMENTS

| | | |
|---|---|---|
| 9,216,546 B2 | 12/2015 | Desimone et al. |
| 9,434,107 B2 * | 9/2016 | Zenere ................. B29C 64/135 |
| 9,453,142 B2 | 9/2016 | Rolland et al. |
| 9,598,606 B2 | 3/2017 | Rolland et al. |
| 9,676,963 B2 | 6/2017 | Rolland et al. |
| 10,569,526 B2 * | 2/2020 | FrantzDale ............ B33Y 50/02 |
| 10,647,055 B2 * | 5/2020 | Wynne ................. B29C 64/393 |
| 10,933,580 B2 * | 3/2021 | Truong ................. B29C 64/245 |
| 11,141,909 B2 * | 10/2021 | Kuijpers ............... B29C 64/129 |
| 11,169,067 B2 * | 11/2021 | Medalsy ................ B33Y 10/00 |
| 2009/0130449 A1 * | 5/2009 | El-Siblani ............. B33Y 70/00 |
| | | 428/409 |
| 2019/0134899 A1 * | 5/2019 | Mueller ................ B29C 64/393 |
| 2020/0070408 A1 * | 3/2020 | Elsey ................... B29C 64/245 |
| 2021/0031458 A1 * | 2/2021 | Ong ..................... B29C 64/393 |

\* cited by examiner

RESIN VISCOSITY DETECTION IN ADDITIVE MANUFACTURING

RELATED APPLICATIONS

This application claims priority to U.S. Provisional Application Ser. No. 62/839,187, filed Apr. 26, 2019, the disclosure of which is hereby incorporated by reference in its entirety.

FIELD OF THE INVENTION

The present invention concerns stereolithography methods and apparatus, particularly those for carrying out bottom-up additive manufacturing, such as continuous liquid interface production.

BACKGROUND OF THE INVENTION

A group of additive manufacturing techniques sometimes referred to as "stereolithography" creates a three-dimensional object by the sequential polymerization of a light polymerizable resin. Such techniques may be "bottom-up" techniques, where light is projected into the resin on the bottom of an object growing on a build platform above a light transmissive window, or "top down" techniques, where light is projected onto the resin on top of the growing object, which is then immersed downward into the pool of resin.

The introduction of more rapid stereolithography techniques sometimes referred to as continuous liquid interface production (CLIP), coupled with the introduction of "dual cure" resins for additive manufacturing, has expanded the usefulness of stereolithography from prototyping to manufacturing (see, e.g., U.S. Pat. Nos. 9,211,678; 9,205,601; and 9,216,546 to DeSimone et al.; and also in J. Tumbleston, D. Shirvanyants, N. Ermoshkin et al., Continuous liquid interface production of 3D Objects, *Science* 347, 1349-1352 (2015); see also Rolland et al., U.S. Pat. Nos. 9,676,963, 9,453,142 and 9,598,606). For such purposes, bottom-up stereolithography is preferred, as the pool of resin (sometimes provided on a "window cassette") can be more shallow and hence smaller in volume.

The production of accurate three dimensional objects at even reasonable speeds requires satisfactory control, made in light of variables such as light intensity, resin temperature, resin viscosity (which can vary as resin temperature varies), object geometry, and more. Parameters such as resin viscosity can vary from resin batch to batch, can depend on the age of the resin, can depend on how the resin has been stored, and even vary based on the current temperature of the resin. Accordingly, there is a need for methods and apparatus for measuring resin viscosity close in time to the use of the resin for the production of objects.

SUMMARY OF THE INVENTION

According to some embodiments of the present invention, a method of measuring the viscosity of a resin in a bottom-up additive manufacturing apparatus, comprising the steps of: (a) providing an additive manufacturing apparatus including a build platform and a light transmissive window, said build platform and said window defining a build region there between, with said window carrying a resin; (b) advancing said build platform and said window towards one another until said build platform contacts said resin; (c) detecting the force exerted on said build platform by said resin; and (d) generating in a processor a viscosity measure of said resin from said detected force.

In some embodiments, the generating is carried out with an empirical model.

In some embodiments, the generating is carried out with a regression model (e.g., multi-variate linear regression, random forest regression, etc.).

In some embodiments, the generating is carried out with a machine learned model.

In some embodiments, the apparatus includes a force sensor operatively associated with said build platform and/or said light transmissive window, and the detecting step is carried out by detecting force exerted on said force sensor.

In some embodiments, the force sensor comprises a strain gauge.

In some embodiments, the window is stationary in the lateral (X, Y) dimensions.

In some embodiments, the window is permeable to oxygen.

In some embodiments, the method further includes: (a) recording said viscosity measure in association with a resin batch identity (e.g., as a quality control measure of said resin); and (b) producing an object on said additive manufacturing apparatus, wherein said producing is modified based on said viscosity measure (e.g., by speeding or slowing production).

In some embodiments, an apparatus useful for making a three-dimensional object from a polymerizable resin includes (a) a build platform on which a three-dimensional object can be made; (b) a light transmissive window having a build surface operatively associated with said build platform, said build platform and said build surface defining a build region therebetween, said window configured to support a resin pool thereon; (c) an elevator assembly operatively associated with said build platform and/or said window, said elevator assembly configured for advancing said build platform and said window member away from one another to draw said polymerizable liquid into said build region; (d) a light engine operatively associated with said window and positioned to irradiate said build region with light to form a growing three-dimensional object from said resin; (e) a force sensor operatively associated with said platform and/or said window and configured to detect force exerted on said build platform upon contacting said resin; and (f) a controller operatively associated with said carrier platform, said light engine, and said force sensor, said controller configured to generate a viscosity measurement for said resin from said detected force.

In some embodiments, the window is stationary in the lateral (X, Y) dimensions.

In some embodiments, the light engine comprises a light source (e.g., a laser) in combination with a patterning array (e.g., a liquid crystal display array or a digital micromirror array).

In some embodiments, the force sensor comprises a strain gauge.

In some embodiments, the controller generates a viscosity measurement with an empirical model.

In some embodiments, the controller generates a viscosity measurement with a regression model (e.g., multi-variate linear regression, random forest regression, etc.).

In some embodiments, the controller generates a viscosity measurement with a machine learned model.

In some embodiments, the window is permeable to oxygen.

In some embodiments, the controller is configured to (a) record said viscosity measure in association with a resin batch identity (e.g., as a quality control measure of said resin); and (b) produce an object on said additive manufacturing apparatus, wherein said producing is modified based on said viscosity measure (e.g., by speeding or slowing production).

R. Truong, Continuous Liquid Interface Production with Force Monitoring and Feedback, PCT Application WO 2018/111533 (published 21 Jun. 2018), describes the use of a force sensor during production of an object on an additive manufacturing apparatus to enhance efficiency of production, but does not suggest that such a force sensor could be used to measure resin viscosity prior to production of the object.

DETAILED DESCRIPTION OF ILLUSTRATIVE EMBODIMENTS

Figure 1:
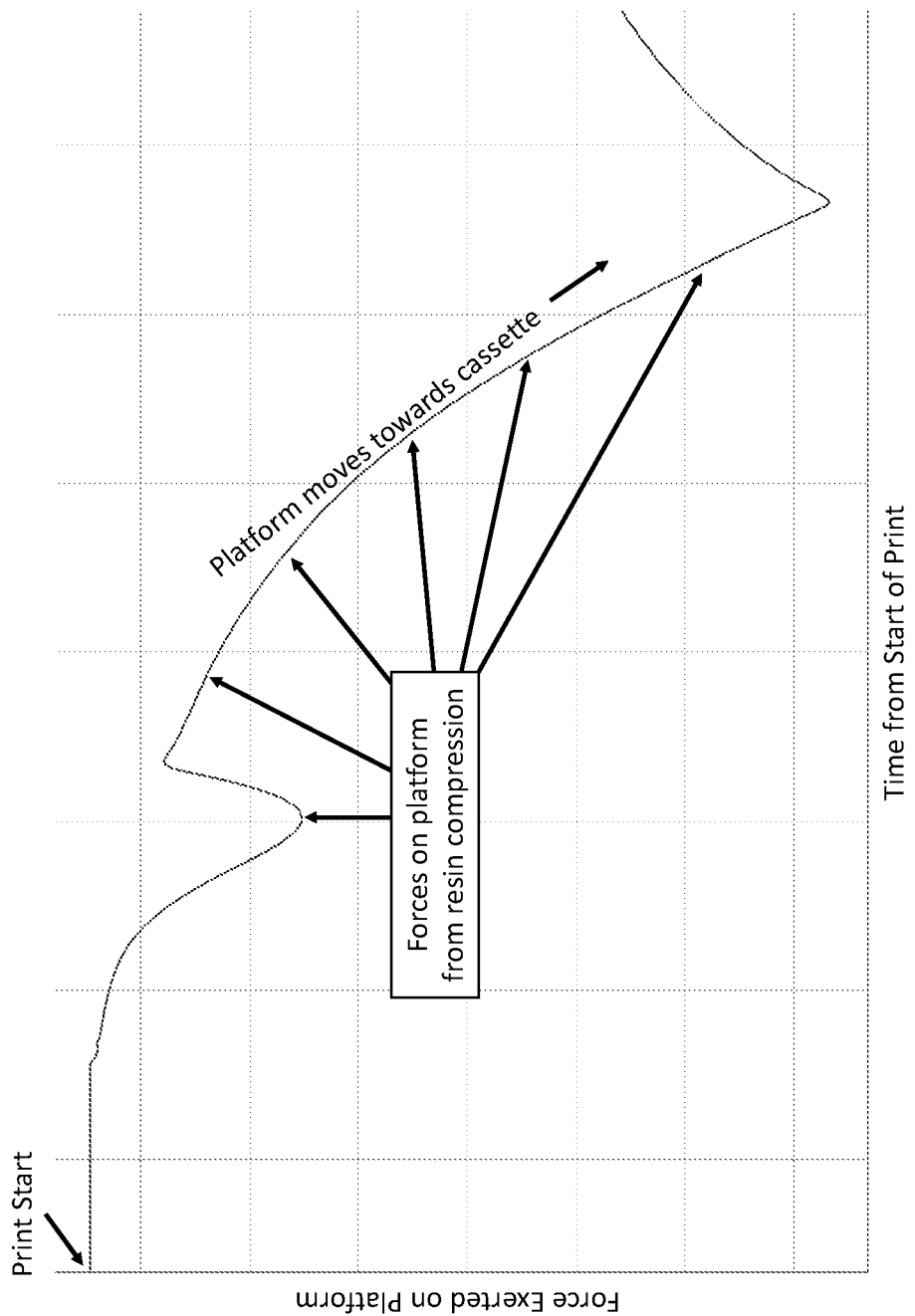
FIG. 1 is a graph illustrating the forces exerted on the build platform in on example of a bottom-up stereolithography apparatus after print start. During the initial descent of the platform towards the cassette, the resin exerts compressive forces on the platform.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

1. General Methods and Apparatus.

Suitable additive manufacturing apparatus include those configured for carrying out bottom-up additive manufacturing. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and U.S. Patent Application Publication No. 2013/0295212 to Chen et al. The disclosures of these patents and applications are incorporated by reference herein in their entirety.

In some embodiments, the additive manufacturing step is carried out by one of the family of methods sometimes referred to as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, *Science* 347, 1349-1352 (2015); and in R. Janusziewcz et al., Layerless fabrication with continuous liquid interface production, *Proc. Natl. Acad. Sci. USA* 113, 11703-11708 (Oct. 18, 2016). Other examples of methods and apparatus for carrying out particular embodiments of CLIP, or of additive manufacturing, include but are not limited to those described in B. Feller, U.S. Patent App. Pub. No. U.S. 2018/0243976 (published Aug. 30, 2018); M. Panzer and J. Tumbleston, U.S. Patent App Pub. No. U.S. 2018/0126630 (published May 10, 2018); K. Willis and B. Adzima, U.S. Patent App Pub. No. U.S. 2018/0290374 (Oct. 11, 2018); Batchelder et al., U.S. Patent Appub. No. U.S. 2017/0129169 (May 11, 2017); Sun and Lichkus, U.S. Patent App Pub. No. U.S. 2016/0288376 (Oct. 6, 2016); Willis et al., U.S. Patent App Pub. No. U.S. 2015/0360419 (Dec. 17, 2015); Lin et al., U.S. Patent App Pub. No. U.S. 2015/0331402 (Nov. 19, 2015); and D. Castanon, U.S. Patent App Pub. No. U.S. 2017/0129167 (May 11, 2017), the disclosures of which are incorporated by reference herein in their entirety.

2. Implementation of Resin Viscosity Sensing by Platform Force Detection.

Figure 2:
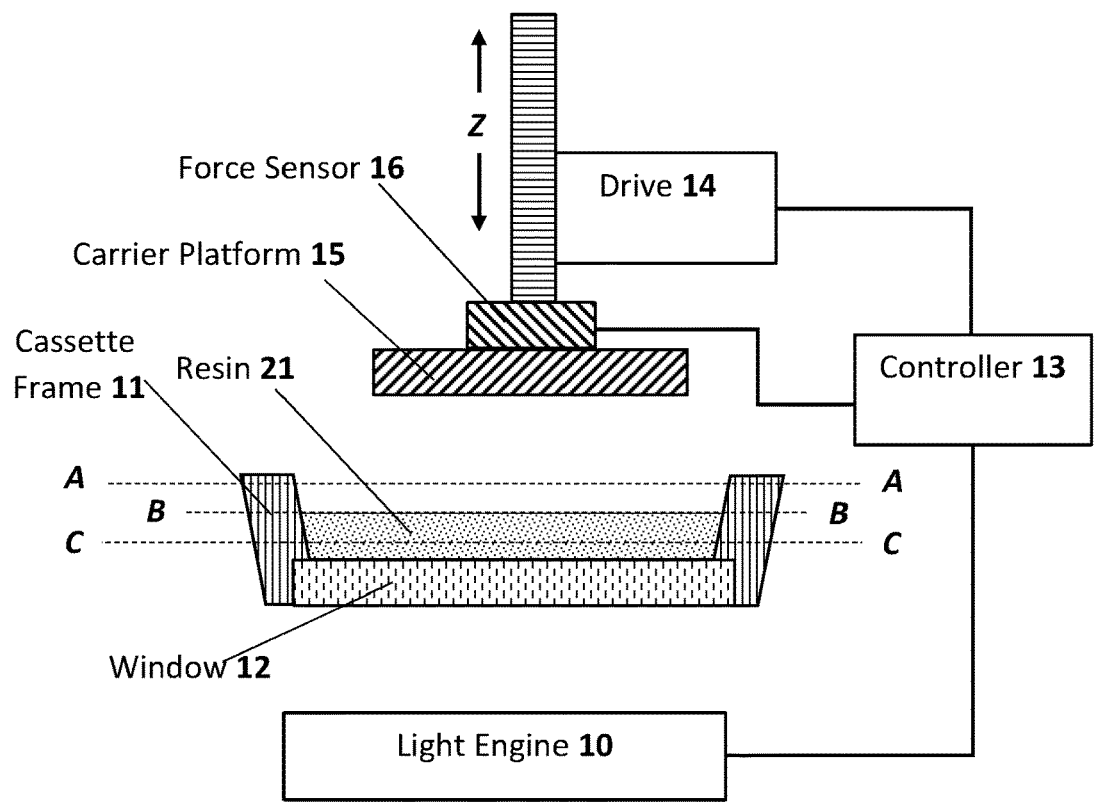
FIG. 2 is a schematic diagram illustrating an apparatus useful for carrying out the present invention, prior to initiating production of an object and prior to determining resin viscosity.
Figure 3:
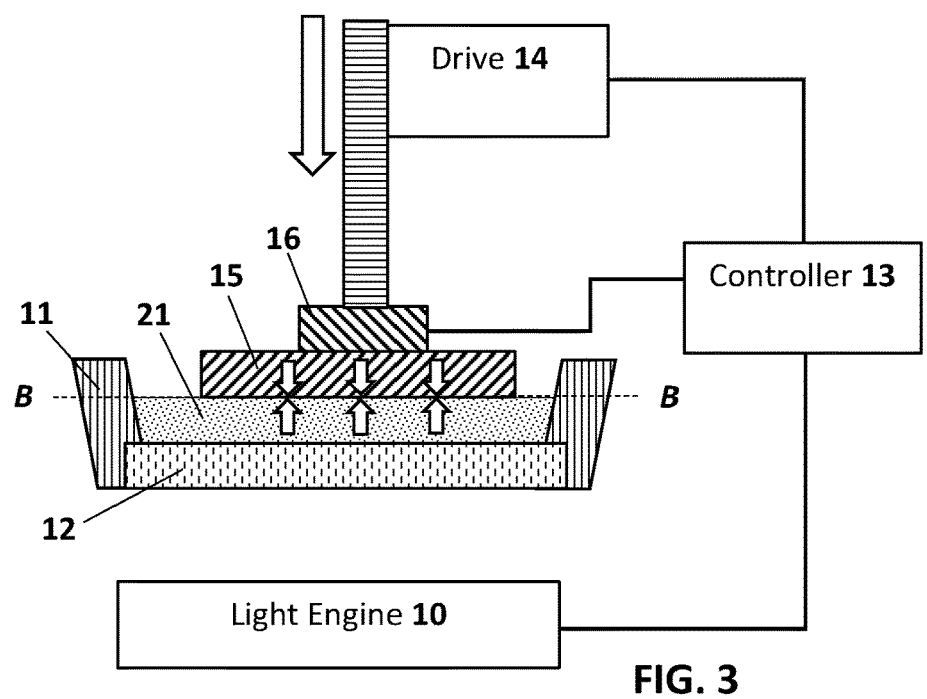
FIG. 3 is a schematic diagram similar to FIG. 2, except that the build platform has now been advanced down to contact the resin top surface portion, so that impact can be detected and resin viscosity determined.
Figure 4:
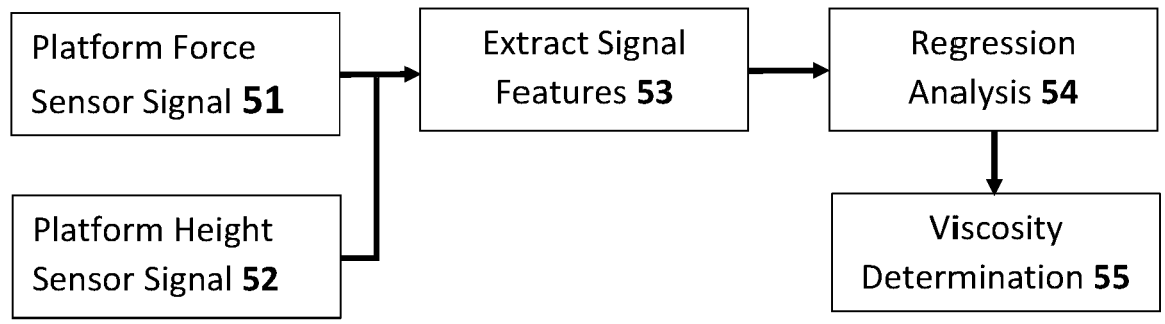
FIG. 4 is a flowchart demonstrating the processing of build platform force and height time series data, which is fed into a regression model for the prediction of viscosity.

FIGS. 2-3 schematically illustrate an apparatus useful for carrying out the present invention. In general, the apparatus includes a light engine 10, a window (or "build plate") 12, a controller 13, and elevator and drive assembly 14. A carrier platform (or "carrier plate") 15 is mounted to the elevator and drive assembly as in conventional apparatus, but with a force sensor 16 operatively associated therewith. The window may be provided as a "cassette" having a frame 11, which cassette is removable from the overall apparatus. A polymerizable liquid or resin 21 is provided on top of the window 12, the resin having a fill level B-B, which fill level is preferably positioned between a maximum fill level A-A and a minimum fill level C-C. The three sets of arrows facing one another in FIG. 3 illustrate the impact of the carrier platform with the resin surface portion when the carrier platform is advanced to the resin.

The window 12 may be impermeable or semipermeable to an inhibitor of polymerization (e.g. oxygen), depending on which particular approach for carrying out additive manufacturing is employed. In some embodiments, the window comprises a fluoropolymer, in accordance with known techniques.

Any suitable light engine 11, including any of a variety of light sources and/or patterning elements, may be used, including lasers (e.g., scanning lasers as in traditional stereolithography), liquid crystal display (LCD) panels, digital micromirror displays (DMDs), etc. A single light engine may be used, or a tiled set of light engines may be used, depending on the size of the window 12 and the desired resolution.

While the schematic suggests that advancing is accomplished by lowering the carrier on the elevator, note also that advancing may be achieved by providing a fixed or static carrier, and by mounting the window and light engine on an elevator beneath the same, which can then be raised.

Any suitable device may be used as force sensor 16. Examples include, but are not limited to, mechanical tactile sensors, capacitive force sensors, metal strain gauges, semiconductor strain gauges, conductive elastomers, carbon felt and carbon fiber sensors, piezoelectric force sensors, pyroelectric force sensors, optical force sensors, magnetic force sensors, ulotrasonic force sensors, electrochemical force sensors, etc., including combinations thereof. See, e.g., Matthias Fassler, *Force Sensing Technologies* (Swiss Federal Institute of Technology Zurich, Spring Term 2010). One suitable example is the Omega LCM202-1KN Miniature Metric Universal Load Cell, available from Omega Engineering, Inc. (800 Connecticut Ave., Suite 5N01, Norwalk, Conn. 06854 USA). Any suitable configuration of the force sensor or load cell may be used, including but not limited to a single load cell mounted (or "sandwiched") in-line between the carrier and the elevator. The force sensor may include multiple force sensors providing an averaged output (e.g., sandwiched between a compression plate to equalize load), and/or may include multiple force sensors providing independent data from multiple regions of the carrier. In addition, force sensing can be carried out by sensing motor current or torque, or any other direct or indirect measure of force.

Note that, where interchangeable cassettes are not employed, or where all cassettes have the same dimensions and volume, the steps of converting resin level to resin volume described in the methods and systems above can be eliminated.

In some embodiments, the force sensor may be also used by the apparatus to determine when resin flow into the build region is substantially completed, to facilitate or speed production of objects with the apparatus, such as described in R. Truong, Continuous Liquid Interface Production with Force Monitoring and Feedback, PCT Application WO 2018/111533 (published 21 Jun. 2018).

Generating the viscosity measurement can be carried out in any suitable processor, including the apparatus controller 13, a cloud-based processor, etc. The viscosity measurement can be generated from the position and force data by known techniques with an empirical model, such as a regression model, based on actual data from a corresponding standard resin or sampling of resins. The model can be updated as additional resins are sampled, as in a machine learning method, again in accordance with known techniques.

Aspects of the present invention are explained further in the following non-limiting example.

EXAMPLE

During the initial descent of the platform towards the cassette window in one example of a bottom-up stereolithography apparatus (e.g., a Carbon Inc. M1 apparatus, available from Carbon Inc., 1089 Mills Way, Redwood City, Calif. USA), the platform load cell experiences forces due to resistance from the resin (FIG. 1). After reaching a pre-specified distance from the window, the platform remains at this distance and the compressive forces on the platform relax, as shown on the right side of FIG. 1. The velocity of the platform is not constant during this descent, as the platform slows as the distance from the window decreases. Hence, the shape of the force profile does not follow a simple asymptotic relationship. Additionally, there is variability between print jobs in the platform descent velocity, and the final distance between the platform and the window, which influence the shape of the force profile. Thus, it is a challenge to identify features of the force profile that are correlated with resin viscosity, while remaining insensitive to parameters of the print job.

As shown in FIG. 3, using platform force and position time series data, various features are extracted which are strongly correlated with resin viscosity. Examples of such features are the force on platform at specified distances with the window, or the half-life of the compressive forces while the platform remains at a fixed distance. Other examples of features consider combinations of printer signals, such as the force divided by the platform velocity at a specific location, or the derivative of the force with respect to the platform height.

A statistical model is then developed to predict resin viscosity given these features. In order to build this model, a dataset for which viscosities and the aforementioned features of time series data are known must exist. Using this dataset, a model that maps these features of the force and platform position data to resin viscosity is developed. It is also preferred to generate a dataset for which a wide range of viscosities are well defined. For this purpose, a viscosity standard, silicone oil, was used. A spectrum of viscosities was generated by controlling the temperature of the oil. The oils viscosity at a fixed temperature was measured using a viscometer; the force profile of a print job was obtained at a corresponding temperature, and from these data a model was generated.

Two such models were created and found to give good predictions of viscosity: multi-variate linear regression, and random forest regression. These models are widely used in the field of machine learning, but are quite different from one another. Linear regression is a parametric method which assumes that the values of features linearly scale with the viscosity, and that features are independent from one another. Random forest regression is a more flexible model, which consists of an ensemble of decision trees. The value of the viscosity is predicted as an average of many decision trees. Random forest is not a parametric method, and makes no assumptions on the functional form of relations between features and the target viscosity. Other models exist which were also tested for prediction of viscosity, such as support vector regression.

Figure 5:
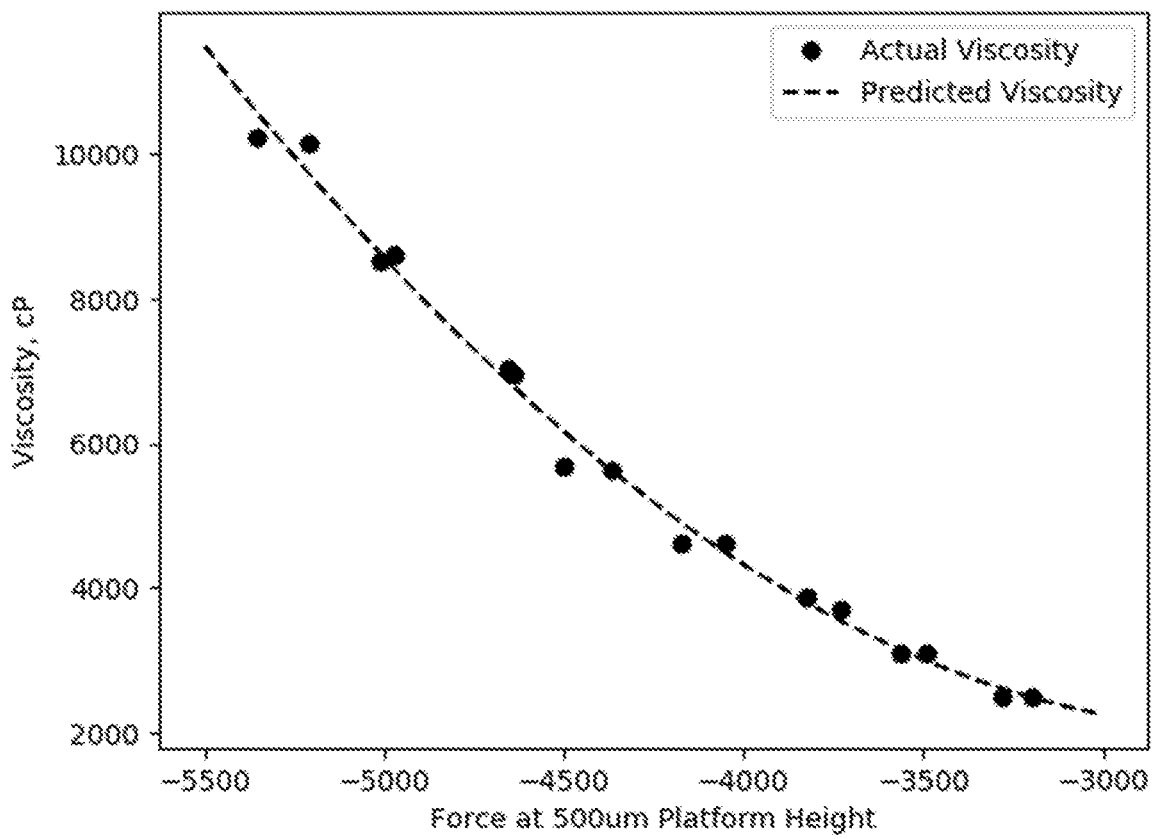
FIG. 5 is a graph illustrating the actual viscosity (measured by viscometer) alongside the model's predicted viscosity.

In order to improve the practicality of viscosity prediction, and the generalizability of the model towards predicting viscosity of many resins, it is desirable to use as few features in prediction as possible. The best set of features for predicting resin viscosity was identified using a forward selection method, during which features were iteratively added to the model and selected based on minimizing the mean absolute error of viscosity predictions. The final model makes use a set several features to predict viscosity to +/−440 cP (95% confidence interval of model error). FIG. 5 demonstrates the predicted and actual viscosities for silicone oil in the printer. While similar levels of accuracy are expected to be attainable for stereolithography resins, it will be appreciated that looser measurement tolerances will be acceptable in situations where slower production speeds, less accurate object production, or the like are acceptable.

The foregoing is illustrative of the present invention, and is not to be construed as limiting thereof. The invention is defined by the following claims, with equivalents of the claims to be included therein.

We claim:
1. A method comprising the steps of:
   (a) providing a bottom-up additive manufacturing apparatus including a build platform and a light transmissive window, said build platform and said window defining a build region there between, with said window carrying a resin;
   (b) advancing said build platform and said window towards one another until a surface of said build platform facing said window contacts said resin;
   (c) detecting the force exerted on said build platform by said resin using a force sensor arranged against a side of said build platform opposing said surface; and
   (d) generating in a processor a viscosity measure of said resin using said detected force and position time series data of said platform.

2. The method of claim 1, wherein said generating is carried out with an empirical model.

3. The method of claim 1, wherein said generating is carried out with a regression model.

4. The method of claim 1, wherein said generating is carried out with a machine learned model.

5. The method of claim 1, wherein said apparatus further includes a force sensor operatively associated with said light transmissive window, and said detecting step includes detecting force exerted on said force sensor operatively associated with said window.

6. The method of claim 1, wherein said force sensor comprises a strain gauge.

7. The method of claim 1, wherein said window is stationary in the lateral (X, Y) dimensions.

8. The method of claim 1, wherein said window is permeable to oxygen.

9. The method of claim 1, further comprising:
   (a) recording said viscosity measure in association with a resin batch identity; and
   (b) producing an object on said build platform of said additive manufacturing apparatus, wherein said producing is modified based on said viscosity measure.

* * * * *